(12) United States Patent
Hammarstrand

(10) Patent No.: US 6,497,376 B2
(45) Date of Patent: Dec. 24, 2002

(54) CUTTING DEVICE

(75) Inventor: Per-Åke Hammarstrand, Näckrosstigen (SE)

(73) Assignee: KPAB ETT Bendersföretag AB, Kvanum (SE)

( * ) Notice: Subject to any disclaimer, the term of this patent is extended or adjusted under 35 U.S.C. 154(b) by 0 days.

(21) Appl. No.: 09/853,498

(22) Filed: May 11, 2001

(65) Prior Publication Data

US 2001/0020659 A1 Sep. 13, 2001

Related U.S. Application Data

(63) Continuation of application No. 09/566,235, filed on May 5, 2000, which is a continuation of application No. PCT/SE98/02004, filed on Nov. 5, 1998.

(30) Foreign Application Priority Data

Nov. 5, 1997 (SE) ............................................... 9704077

(51) Int. Cl.⁷ ............................................... B02C 18/18
(52) U.S. Cl. ....................................................... 241/243
(58) Field of Search ............................... 241/243, 292.1

(56) References Cited

U.S. PATENT DOCUMENTS

| 2,213,906 A | 9/1940 | Ebersol |
| 2,584,262 A | 2/1952 | De Lamater, Sr. |
| 4,532,941 A | 8/1985 | Gauthier |

FOREIGN PATENT DOCUMENTS

| CH | 474 209 | 6/1969 |
| DE | 24 39 500 | 2/1976 |
| DE | 297 541 | 9/1990 |
| DE | 195 47 355 | 7/1997 |
| EP | 0331784 | 11/1991 |
| GB | 1060179 | 3/1967 |
| SE | 117 423 | 8/1946 |
| SE | 516/65 | 1/1965 |

Primary Examiner—Mark Rosenbaum
(74) Attorney, Agent, or Firm—Samuels, Gauthier & Stevens, LLP

(57) ABSTRACT

The present invention relates to a cutting device for cutting straw and similar material into pieces, of the type which comprises a driven shaft (11) kept in a housing (21), where said shaft (11) is provided with longitudinally proceeding rows (1–6) of knife attachments for knives (15), which extends radially from the shaft and are provided with cutting edges. Said knives (15), under operation pass between a row of counter knives (19) directed towards said shaft and preferably provided with cutting edges in the same way, whereby the straw material to be cut is fed towards said counter arms (9). The number of rows (1, 2, 3, 4, 5, 6) with knife attachment (14) are at least six. The distances between three knife attachments in a longitudinally proceeding row, have a proportion of 4:4:5 of a repeating unit, where the arms (4,5) in a rotation round at least forms two screw lines.

1 Claim, 4 Drawing Sheets

CUTTING DEVICE

PRIORITY INFORMATION

This application is a continuation of Ser. No. 09/566,235 filed May 5, 2000, which is a continuation of PCT/SE98/02004 filed Nov. 5, 1998.

FIELD OF THE INVENTION

The present invention relates to a cutting device for cutting straw and similar material into pieces, of the type which comprises a driven shaft kept in a housing, where said shaft is provided with longitudinally proceeding rows of knife attachments for knives, which extends radially from the shaft and are provided with cutting edges, whereby said knives under operation pass between a row of counter knives directed towards said shaft and in the same way suitably are provided with cutting edges, whereby the straw material to be cut is being fed towards said counter arms.

BACKGROUND OF THE INVENTION

Cutting devices for the cutting of straw and the like into pieces are previously known, which comprises a rotating drum shaft, on which pivotable knives are arranged in rows, which knives through their passage between counter knives cut fed straw material, compare for instance GB-A-1,060, 179. These known devices have always exhibited as a maximum, four rows of knives, usually arranged in pairs opposite each other or with the rows slightly displaced in respect to adjacent rows. The problem with the known devices is a limited amount of cutting, the average cutting length being too long and too low a level of splintering, which severely affects the ability of mouldering of the cut straw, even if the knife rotor normally works with a high rotational speed, which requires a high energy input.

A cutting device for cutting turnip tops and other green fodder to be ensilaged is previously known from SE 117 423 C, where a high degree of decomposition is required, which one has attempted to achieve by means of the arrangement of six rows of knives. As long as the green fodder is fresh, even a four-row cutting device will manage the required degree of cutting, but not when the material is dry and tough. The device must also tolerate that stones can be brought with the green fodder into the cutting device. This problem has been solved, by the removal of the traditional, rigid counter knives and instead transporting the green fodder to, in the rotational direction of the knife rotor, the rear half of the drum, where an opening is arranged through which the stones may leave the device.

Since the known cutting device lacks counter knives, it can not be used for cutting straw or the like, additionally would it, due to its particular construction, very rapidly become jammed by uncut straw as the material to be cut has to be fed more than 180° through the housing.

SUMMARY OF THE INVENTION

The purpose of the present invention is to provide a cutting device, which:

has a large input opening for straw, has a higher cutting capacity per time period, gives a shorter average cut length than conventional devices, has a high splinter degree, has a high peripherical speed, has a smoother operation, has a lower noise level, and this at essentially the same energy demand as a conventional cutting device.

Surprisingly, it has now been shown possible to increase the cutting capacity with a device according to the invention, which has at least six rows of knives distributed over the periphery of the shaft drum and which extend over essentially the whole width of the threshing machine, which provides for the increase of the straw input opening. The increased number of knife rows and the fact that each knife attachment carries double, pivotable knives has lead to a major increase of the capacity.

The greater number of pivotable knives has also lead to the corresponding increase of the number of rigid counter knives, leading to a decreased average cutting length and a higher degree of splintering of the straw, at the same time as increasing the peripherical speed at the same rotation speed, by increasing the diameter of the shaft drum of the knives.

A smoother operation and a better balancing, and a lower noise level have been reached experimentally, by placing the knife attachments to the shaft drum in such way that they follow a sinusoidal helicoidal line.

BRIEF DESCRIPTION OF THE DRAWINGS

The invention will be described more in detail below with reference to the enclosed drawing, which shows a preferred embodiment, without being limited hereto.

DESCRIPTION OF AN EMBODIMENT

Figure 1:
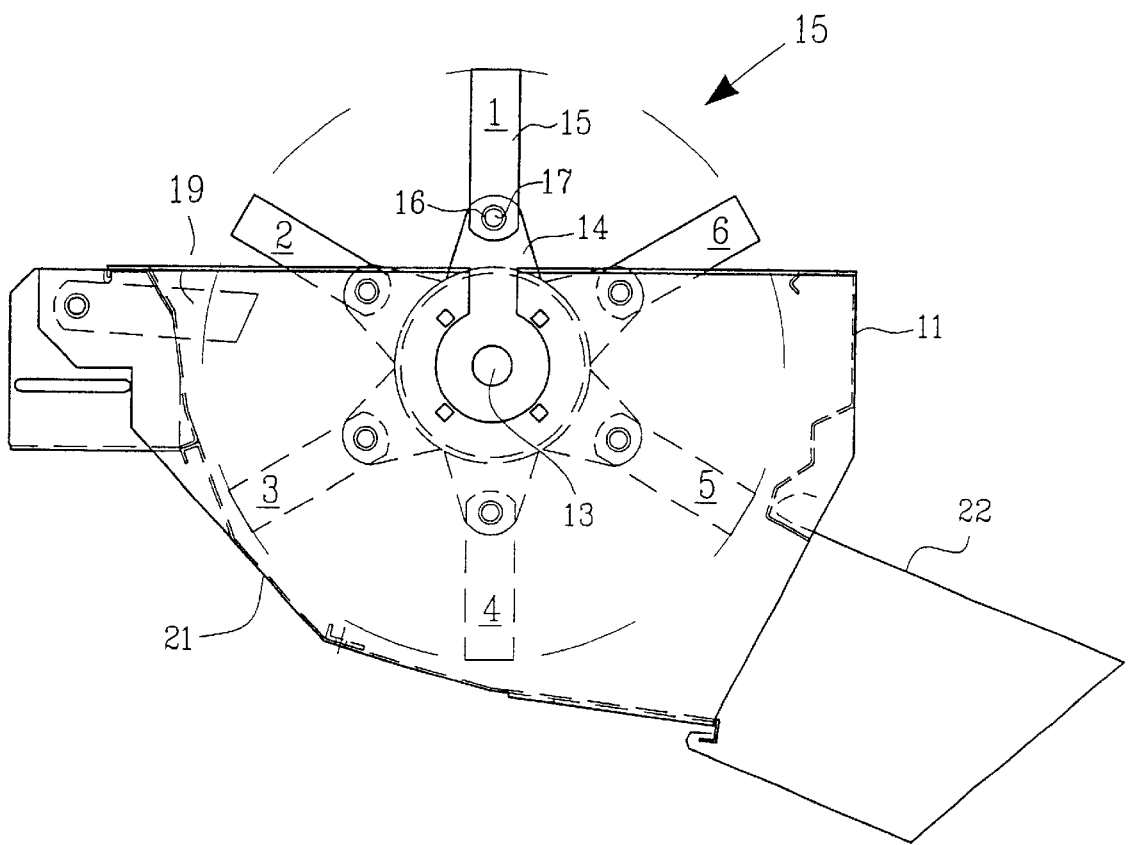
FIG. 1 shows a side view of a cutting device according to the invention without straw feed opening.

In the drawings 10 refers to the rotor of the cutting device, comprising an shaft 11, which is arranged to rotate by means of a motor (not shown). The shaft 11, which preferably consists of a drum is provided with side gables 12 and shaft spindles 13. On the drum 11, knife attachments 14 are arranged in the form of ears, on which knives with edges 15 are carried by bearings 16 and screws 17 and nuts 18. The knife attachments 14 are arranged in six axial rows 1–6, equally distributed along the outer surface of the shaft drum 11 and in 40 radial columns, visible unequally distributed along the outer surface. The knives 15 can either be pivotably arranged in their bearings 16 or alternatively be firmly fixed. In the former case the knives 15 are forced out in a radial direction by the rotation of the drum 11. The knives 15 can be provided with edges along one or both sides possibly also along the end side.

Figure 2:
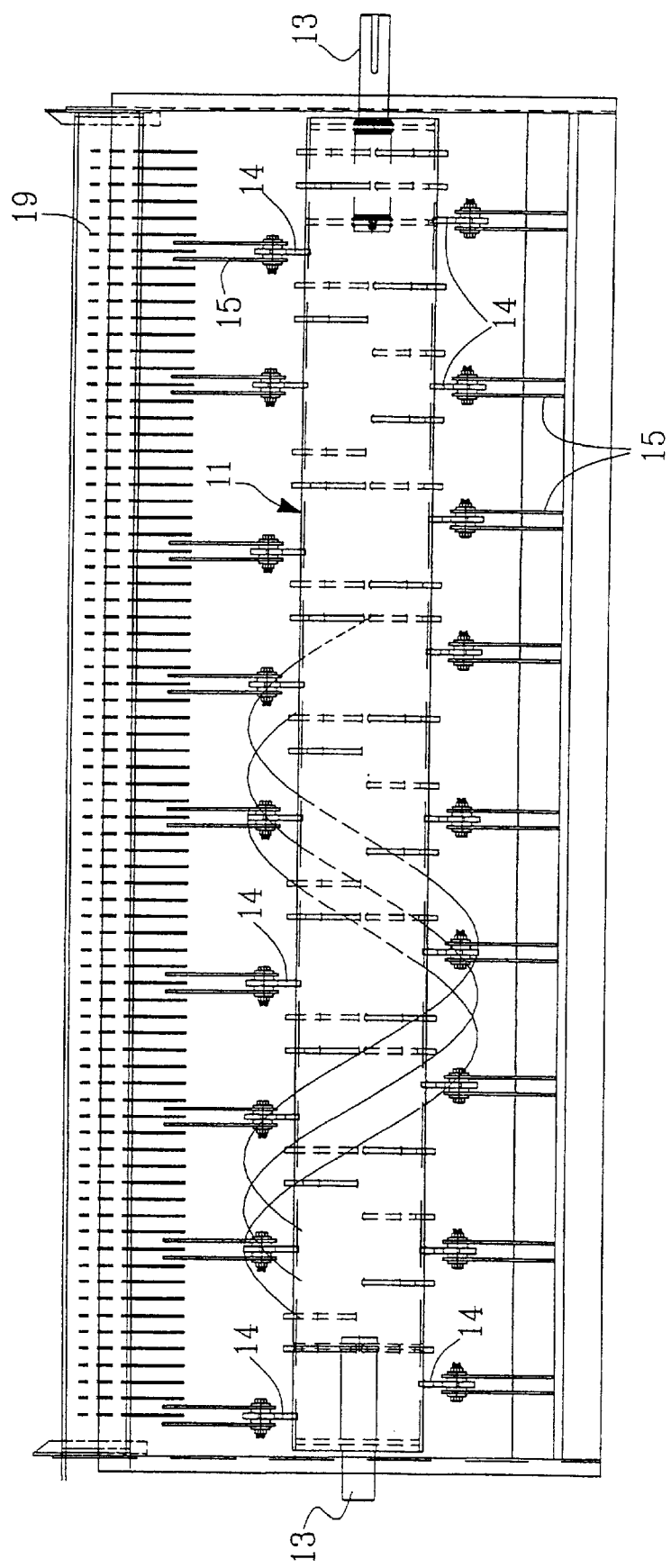
FIG. 2 shows the device according to FIG. 1 seen from above.
Figure 5:
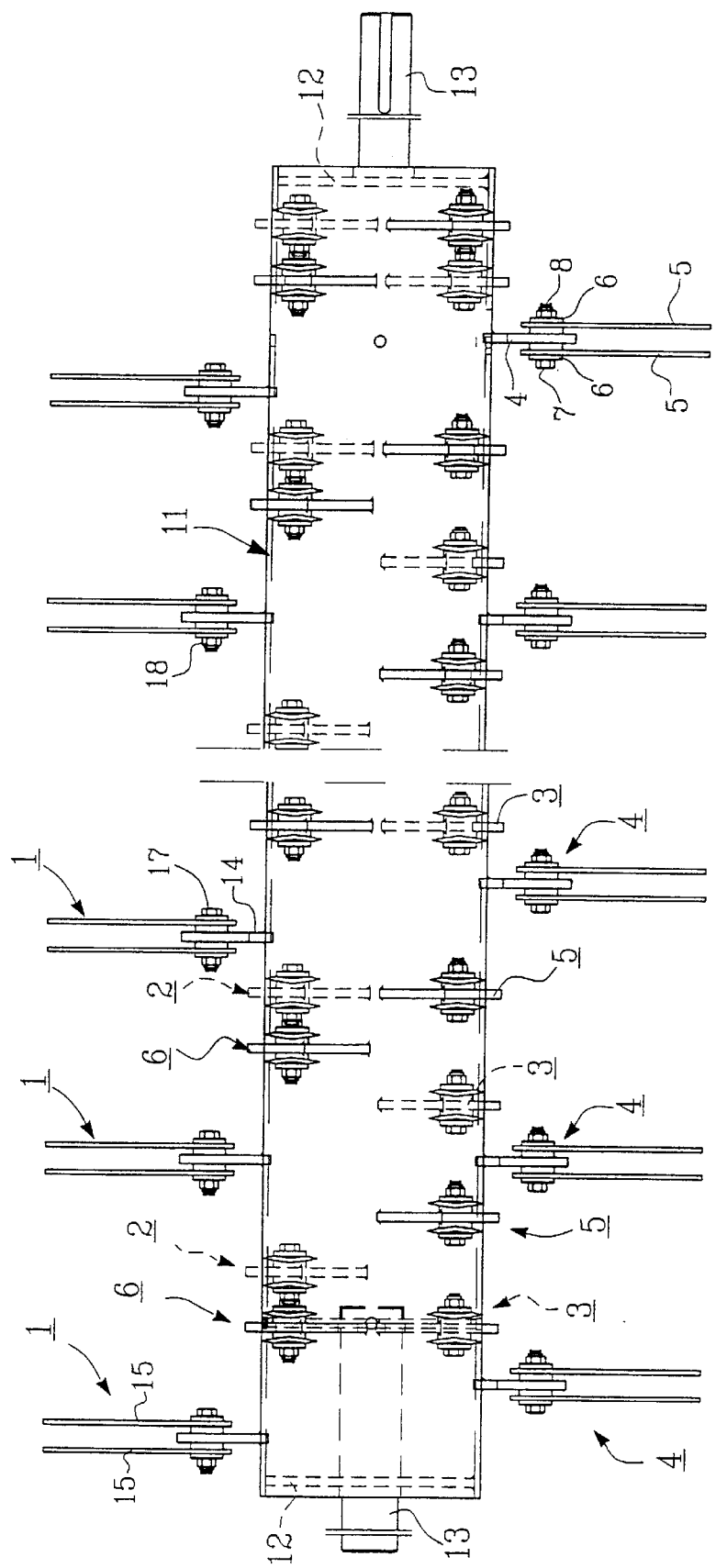
FIG. 5 shows at a larger scale the knife rotor according to FIGS. 3 and 4 in a somewhat more complete assembly.

As evident from FIGS. 2 and 5 the knives are preferably attached in pairs to each ear 14 and are arranged in such a way that they pass between the counter knives 19 at the rotation of the drum, which counter knives preferably are provided with edges as well.

The drum 11 is arranged in a trough-shaped housing 21 to which a funnel or a inlet feed opening for the input of straw material is arranged, and to which trough 21 an outlet part 22 is provided for transport of cut output material. The outlet part 22 can be removable in a known way in order to reach the trough and be turnable to obtain a directed spread.

Figure 3:
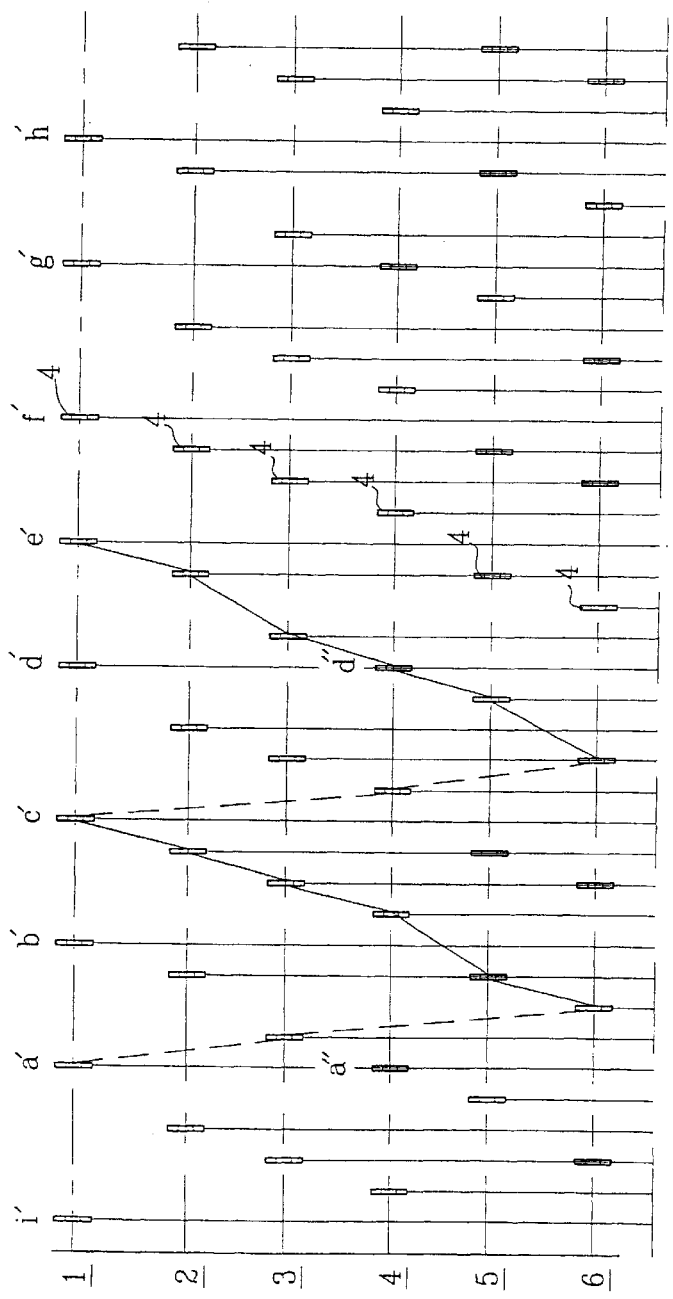
FIG. 3 shows a schematic distribution of the knife attachment on the shaft drum in a planar projection.
Figure 4:
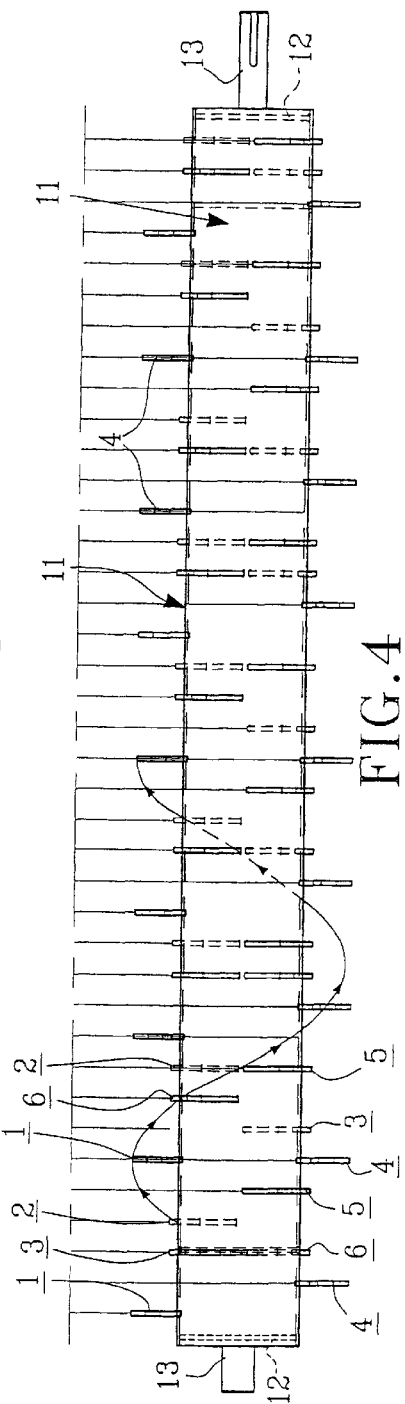
FIG. 4 shows the shaft drum according to FIG. 2 with the knife attachments placed according to FIG. 3 and with marked screw lines which the knife attachments follow.

FIG. 3 shows in a planar projection the six rows of knife attachments 14, which are numbered 1–6. As been shown in the figure, three distances between four on each other following knife attachments in a row have different lengths, with an internal proportion to each other of 4:4:5 in a repetitive unit. Further, the number of the knife attachments are distributed in the radial columns as 1-1-2-1-1-2 and 2-1-1-2-1-1 respectively, corresponding to one round along a sinusoidal line, where -1- refers to a knife attachment and -2- to two knife attachments situated in the same column and opposite each other, i.e. for instance in FIG. 3 the knife attachments a' and a" on the rows 1 and 4 are situated opposite to each other on the outer surface of the drum 11. This distribution of knife attachments leads to the formation of three parallel screw lines along the outer surface of the drum of the different knife attachments, which can be seen in FIG. 4.

In FIG. 5, the different knife attachments have been underlined numbered, 1 2, 3, 4, 5, and 6, according to the scheme in FIG. 3.

The drum or shaft 1 is driven with a speed of 3000 to 3600 rpm, where both higher or lower rotational speeds can be present. By the improved balance of a six row cutting device, the diameter of the shaft drum can be increased from the present 500 mm to 600 mm and the diameter of the shaft drum from 150 mm to 200 mm, whereby a higher peripherical speed can be obtained and thereby a finer and better cutting and an increased cutting capacity per time interval.

What is claimed is:

1. A cutting device for cutting straw and similar material into pieces, comprising:

a driven shaft kept in a housing, the shaft is provided with rows of knife attachments for pivotable knives, the knives are under rotation passing between counter knives arranged in a row in the housing, the counter knives being directed towards said shaft so that the material that is to be cut, is fed towards the counter knives, at least six rows of radially provided knife attachments arranged with substantially equal division between themselves, the knife attachments being distributed over the circumference of the shaft along at least two imagined screw lines, in such a way that the knife attachments are positioned in axial, parallel rows, and the distances between the knives in a longitudinally proceeding, axial row have a proportion of 4:4:5 in repetition.

* * * * *